US009608286B2

(12) United States Patent
Chang et al.

(10) Patent No.: US 9,608,286 B2
(45) Date of Patent: Mar. 28, 2017

(54) METHOD OF CHARGING/DISCHARGING POWER THROUGH PIPELINES FLOWN WITH ELECTROLYTES AND APPARATUS USING THE SAME

(71) Applicant: Institute of Nuclear Energy Research, Atomic Energy Council, Executive Yuan, R.O.C., Taoyuan (TW)

(72) Inventors: Hwei-Liang Chang, Taoyuan (TW); Yu-Te Tsai, New Taipei (TW); Zone-Sure Chang, Taipei (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 147 days.

(21) Appl. No.: 14/696,556

(22) Filed: Apr. 27, 2015

(65) Prior Publication Data

US 2016/0020478 A1 Jan. 21, 2016

(30) Foreign Application Priority Data

Jul. 18, 2014 (TW) .............................. 103124648 A

(51) Int. Cl.
| | |
|---|---|
| H01M 8/18 | (2006.01) |
| H01M 10/44 | (2006.01) |
| H02J 7/00 | (2006.01) |
| H01M 8/20 | (2006.01) |
| H01M 8/00 | (2016.01) |

(52) U.S. Cl.
CPC ........... *H01M 8/188* (2013.01); *H01M 8/004* (2013.01); *H02J 7/0042* (2013.01); *Y02E 60/528* (2013.01)

(58) Field of Classification Search
CPC ........ H01M 8/188; H01M 8/20; H01M 10/44; H02J 7/0042
USPC .......................................................... 320/128
See application file for complete search history.

(56) References Cited

U.S. PATENT DOCUMENTS

| | | | | |
|---|---|---|---|---|
| 3,996,064 | A * | 12/1976 | Thaller ................. | H01M 8/188 320/128 |
| 7,820,321 | B2 * | 10/2010 | Horne et al. ........ | B60L 11/1824 429/120 |
| 8,723,371 | B2 * | 5/2014 | Green ................... | H01M 8/188 307/145 |
| 8,808,897 | B2 * | 8/2014 | Liu et al. .............. | H01M 8/188 429/105 |

(Continued)

*Primary Examiner* — Sun Lin
(74) *Attorney, Agent, or Firm* — Jackson IPG PLLC; Demian K. Jackson

(57) ABSTRACT

Pipelines are used for charging and discharging power in a redox flow battery (RFB). Inner tube made of ion-exchange material is inserted into each of the pipelines. Conductive sleeves are installed on inside and outside the inner tube. Anode electrolyte and cathode electrolyte flow into corresponding ones of the pipelines of the inner tube. Thereby, wires connected with the conductive sleeves are extended out to be used as electrodes. On charging power, the anode electrolyte and the cathode electrolyte flow forwardly; yet, on discharging power, the anode electrolyte and the cathode electrolyte flow backwardly. Thus, the present invention uses pipelines to add or supplement function of charging/discharging power. Even when the RFB is damaged or failed, power is still charged/discharged for effectively improving or ensuring efficiency of the battery.

14 Claims, 7 Drawing Sheets

(56) References Cited

U.S. PATENT DOCUMENTS

| | | | | |
|---|---|---|---|---|
| 2011/0048800 | A1* | 3/2011 | Green | H01M 8/188 174/9 F |
| 2015/0325874 | A1* | 11/2015 | Spaziante et al. | H01M 8/04955 429/418 |
| 2015/0380754 | A1* | 12/2015 | Lee et al. | H01M 8/04276 429/90 |

* cited by examiner

METHOD OF CHARGING/DISCHARGING POWER THROUGH PIPELINES FLOWN WITH ELECTROLYTES AND APPARATUS USING THE SAME

TECHNICAL FIELD OF THE INVENTION

The present invention relates to using pipelines to charge/discharge power; more particularly, relates to using a multi-sleeve structure of pipelines to add or supplement function of charging/discharging power, where, even when a redox flow battery (RFB) is damaged or malfunctioned, electrolytes still charges/discharges power as usual through the pipelines for effectively improving or ensuring efficiency of the battery.

DESCRIPTION OF THE RELATED ART

Typically, a power-charging/discharging flow battery (or RFB) is connected with a proper number of pipelines to complete a whole system for storing electrical energy.

Therein, inlet and outlet of the RFB are connected to fluid tanks and a battery through the pipelines. In FIG. 7, energy-lacking electrolytes $6a,6b$ for anode and cathode are flown to the RFB 7 through first and second pipelines 61,62 separately. After being stored with energy through the RFB 7 being connected to an external power supply 8, energy-rich electrolytes $6c,6d$ are obtained. In practice, the energy-lacking electrolytes $6a,6b$ are received and sent to the same fluid tank, i.e. a first fluid tank 9, by using transmitting power of a circulating pump. Similarly, energy-rich electrolytes $6c,6d$ do the same thing, which are received and sent to the same fluid tank, i.e. a second fluid tank 10. Consequently, the existing pipelines contained in the whole system become a little complicated as compared with conventional batteries. While the burden of investment on the pipelines is increased along with the total cost also increased, the power-charging/discharging capacity is still not relatively enhanced. When the original capacity of the system is lowered, the pipelines fail to provide backup power for improving reliability of the system.

Hence, the prior art does not fulfill all users' requests on actual use.

SUMMARY OF THE INVENTION

The main purpose of the present invention is to use a multi-sleeve structure of pipelines to add or supplement function of charging/discharging power, where, even when an RFB is damaged or malfunctioned, electrolytes still charges/discharges power as usual through the pipelines for effectively improving or ensuring efficiency of the battery.

Another purpose of the present invention is to insert an inner tube, made of an ion-exchange material, into existing pipelines, put on an inner and an outer conductive sleeve inside and outside the inner tube and flow electrolytes into corresponding ones of the pipelines of the inner tube for charging/discharging power with electrodes of wires connected with the inner and outer conductive sleeves.

Another purpose of the present invention is to parallelly connect extra bypass pipelines with existing pipelines to be provided as inlets/outlets of the RFB to make the present invention act as a backup battery.

Another purpose of the present invention is to parallelly connect multiple pipelines of the same type to be used as a backup battery with potentials chosen by specific serial/parallel connections.

Another purpose of the present invention is to use pipelines as an emergency power supply, where, even when the RFB is totally disabled or malfunctioned, emergency power is supplied by using the pipelines as a backup battery for effectively enhancing overall reliability of the whole system.

To achieve the above purposes, the present invention is a method of charging/discharging power through pipelines flown with electrolytes, where an inner tube is inserted into each one of pipelines of an RFB; the inner tube is made of an ion-exchange material; an inner conductive sleeve and an outer conductive sleeve are put on inside and outside the inner tube, respectively; electrolytes flow into corresponding ones of the pipelines of the inner tube; and wires connected with the inner and the outer conductive sleeve are separately used as external electrodes to add or supplement function of charging/discharging power through the pipelines; on charging power, the electrolytes flow forwardly; and, on discharging power, the electrolytes flow backwardly. Accordingly, a novel method of charging/discharging power through pipelines flown with electrolytes is obtained.

BRIEF DESCRIPTION OF THE DRAWINGS

The present invention will be better understood from the following detailed description of the preferred embodiments according to the present invention, taken in conjunction with the accompanying drawings, in which.

DESCRIPTION OF THE PREFERRED EMBODIMENTS

Figure 1:
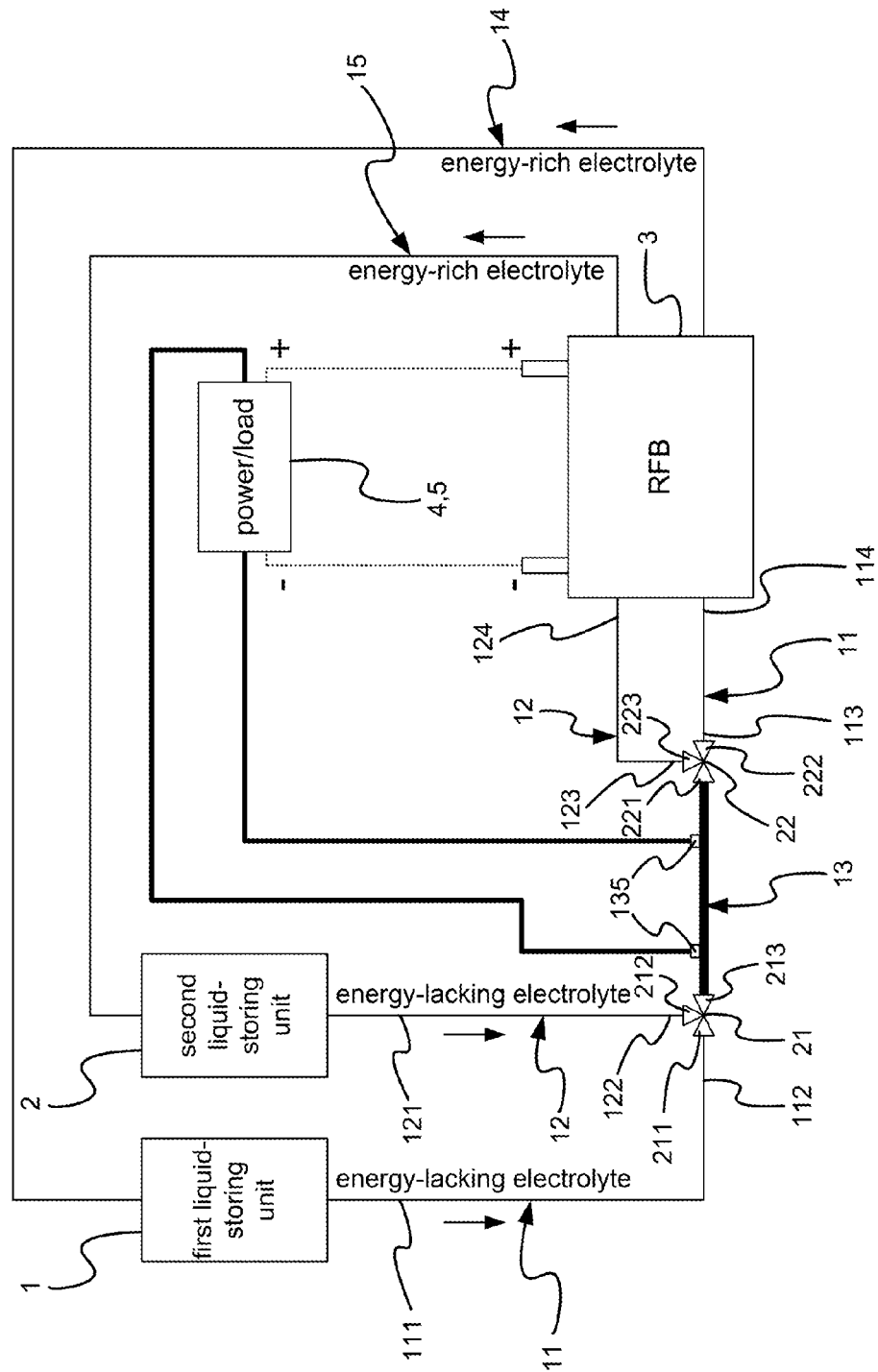
FIG. 1 is the structural view showing the first embodiment according to the present invention.
Figure 2:
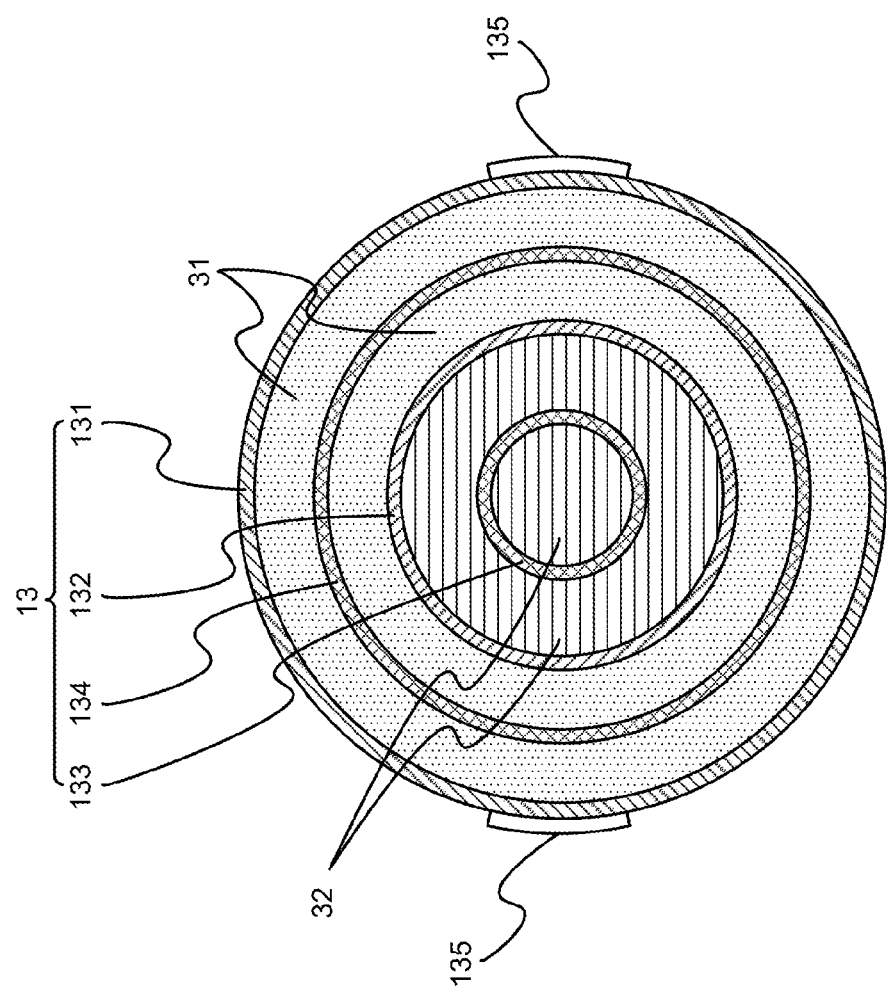
FIG. 2 is the cross-sectional view showing the third pipeline.

The following description of the preferred embodiments is provided to understand the features and the structures of the present invention.

Please refer to FIG. 1~FIG. 4, which are a structural view showing a first embodiment according to the present invention; a cross-sectional view showing a third pipeline; a first state-of-use view showing the third pipeline with a first and a second pipeline; a second state-of-use view showing the third pipeline with the first and the second pipeline. As shown in the figures, the present invention is a method of charging/discharging power through pipelines flown with electrolytes. An apparatus using the method comprises a first pipeline 11, a second pipeline 12, a first tee 21, a third pipeline 13, a second tee 22, a redox flow battery (RFB) 3, a fourth pipeline 14 and a fifth pipeline 15.

The first pipeline 11 has a first end 111 connected to a first liquid-storing unit 1 to transmit a first-polar electrolyte.

The second pipeline 12 has a first end 121 connected to a second liquid-storing unit 2 to transmit a second-polar electrolyte.

The first tee 21 has a first inlet 211, a second inlet 212 and an outlet 213. The first inlet 211 is connected to a second end 112 of the first pipeline 11 and the second inlet 212 is connected to a second end 122 of the second pipeline 12 for inserting one of the pipelines 11,12 into the other pipeline 12,11 leftover.

The third pipeline 13 has an inlet connected to an outlet 213 of the first tee 21. The third pipeline 13 has an outer tube 131 and an inner tube 132, where the inner tube 132 is put in the outer tube 131 and made of an ion-exchange material. An inner conductive sleeve 133 and an outer conductive sleeve 132 are put inside and outside of the inner tube 132, respectively. The first-polar electrolyte and the second-polar electrolyte separately flow into the inner tube 132 and the outer tube 131. A wire connected with the inner conductive sleeve 133 and a wire connected with the outer conductive sleeve 134 are separately extended outside the outer tube 131 as external electrodes 135.

The second tee 22 has an inlet 221, a first outlet 222 and a second outlet 223. The inlet 221 is connected to an inlet of the third pipeline 13. The first outlet 222 is connected to a third end 113 of the first pipeline 11 and the second outlet 223 is connected to a third end 123 of the second pipeline 12 to separate the inner tube 132 and the outer tube 131. Thus, the inner tube 132, along with the inner conductive sleeve 133, and the outer tube 131, along with the outer conductive sleeve 134, are separately connected back to the first and the second pipeline 11,12.

The RFB 3 has an inlet connected to a fourth end 114,124 of the first and the second pipeline 11,12, where, a power supply 4 is externally connected to charge power by converting electrical energy into chemical energy to be stored in the first-polar electrolyte and the second-polar electrolyte; and a load 5 is externally connected to discharge power by converting chemical energy, which is stored in the first-polar electrolyte and the second-polar electrolyte, into electrical energy to be released.

The fourth pipeline 14 has an end connected to an outlet of the RFB 3 and another end connected to the first liquid-storing unit 1, where the first-polar electrolyte returns back to the first liquid-storing unit 1 after charging/discharging power through redox reactions.

The fifth pipeline 15 has an end connected to an outlet of the RFB 3 and another end connected to the second liquid-storing unit 2, where the second-polar electrolyte returns back to the second liquid-storing unit after charging/discharging power through redox reactions.

The first-polar and the second-polar electrolyte are separately an anolyte solution and a catholyte solution of the RFB 3 at oxidation and reduction ends.

The ion-exchange material of the inner tube 12 is a single material or a composite containing the single material, where the single material is a cation-exchange material, an anion-exchange material or a proton-exchange material. The outer tube 11 is made of a conductive material containing graphite, conductive carbon, or metal. The inner and the outer conductive sleeve 133,134 are made of conductive materials, where fluids penetrate walls of the inner and outer conductive sleeve 133,134. Each of the inner and the outer conductive sleeve 133,134 is a braided sleeve or a holes sleeve. The braided sleeve contains carbon fiber, graphite fiber or metal. The metal is a corrosion-resistant metal or a precious metal.

Figure 3:
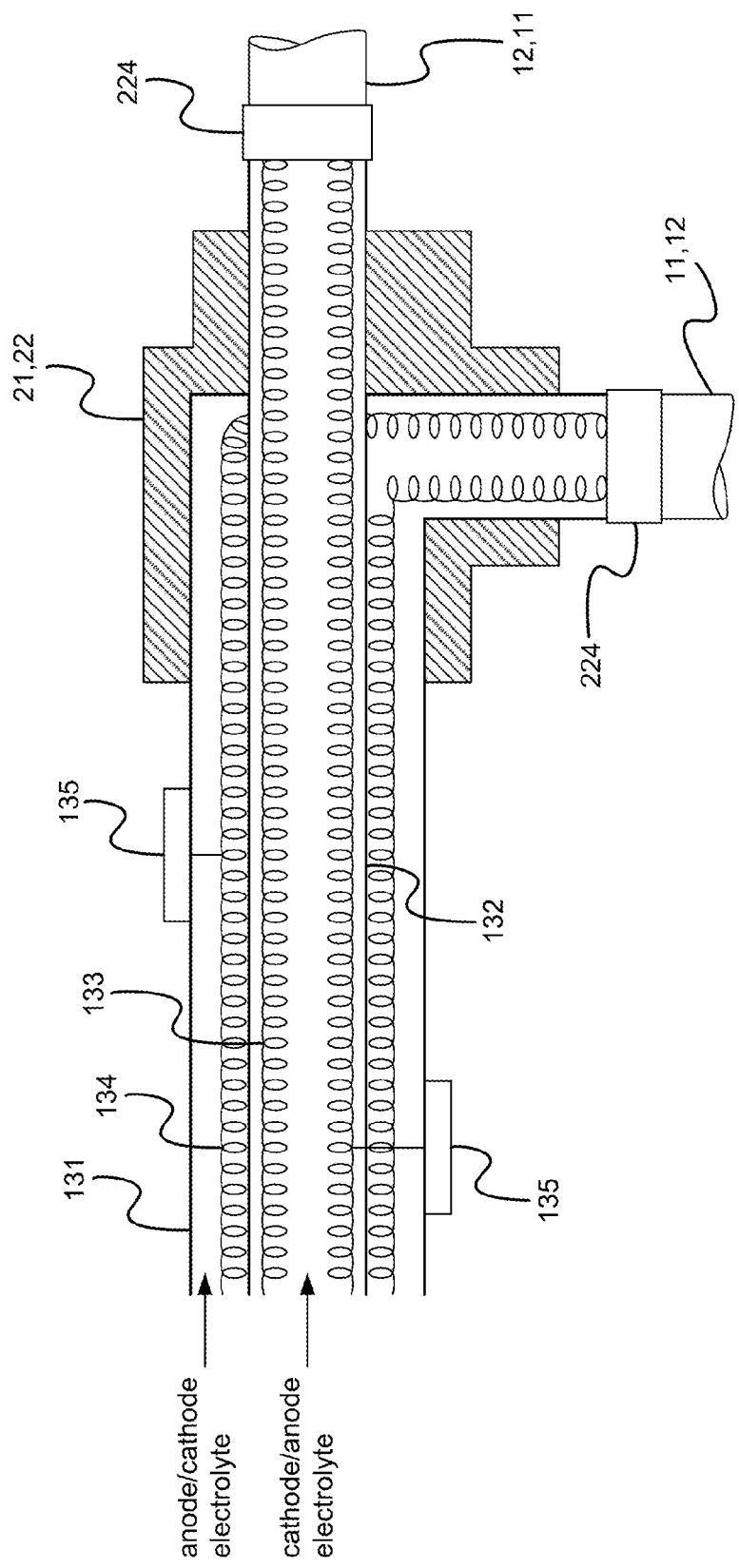
FIG. 3 is the first state-of-use view showing the third pipeline with the first and the second pipeline.
Figure 4:
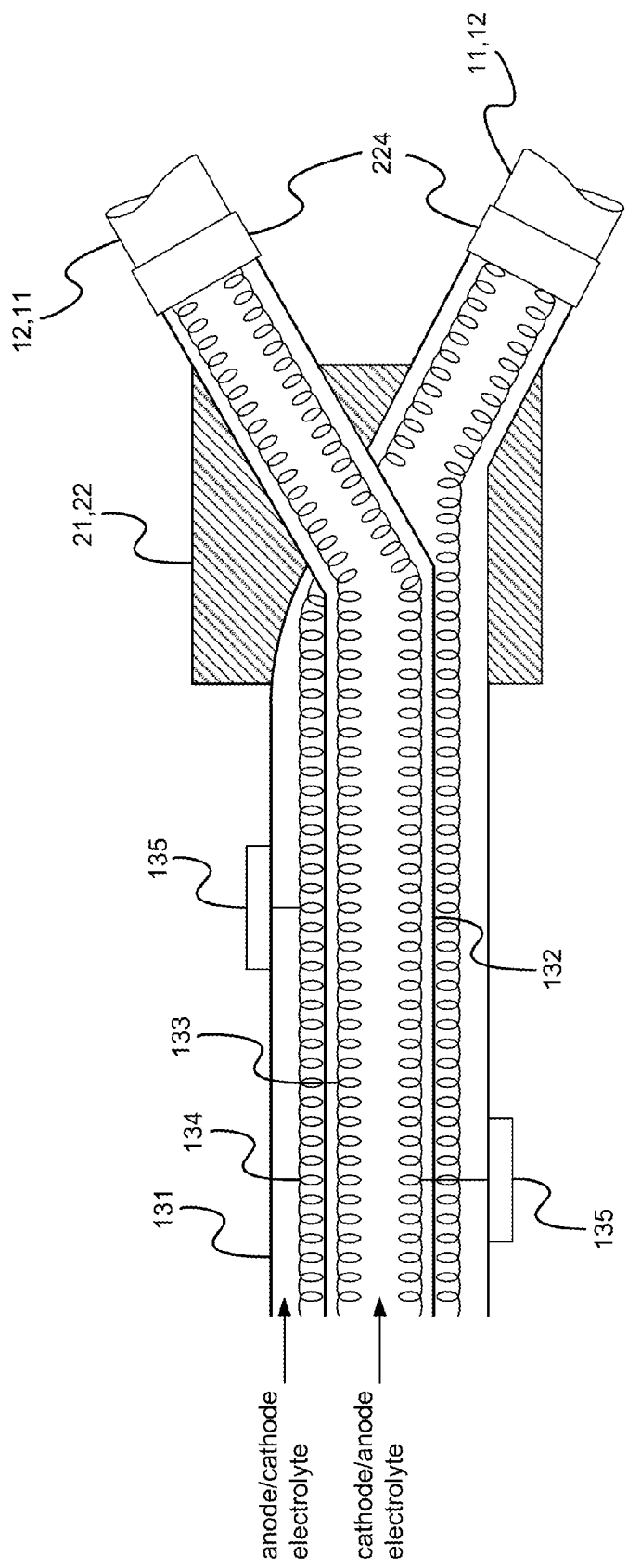
FIG. 4 is the second state-of-use view showing the third pipeline with the first and the second pipeline.

Each of the first and the second tee is a Y-tee, a T-tee, a side-outlet tee, an equal-angle fork tee or a deformed tee; and the deformed tee is a multi-channel joint, which is restructured with sealed channel. In FIG. 3 and FIG. 4, the third pipeline 13 uses the second tee 22 to separate the inner tube 132, along with the inner conductive sleeve 133, and the outer tube 131, along with the outer conductive sleeve 134, to be separately connected back to the first and the second pipeline 11,12.

Thus, a novel method of charging/discharging power through pipelines flown with electrolytes is obtained.

In a state-of-use, the first-polar electrolyte is an anolyte solution 31 and the second-polar electrolyte is a catholyte solution 32. On using the present invention, before the anolyte solution 31 and the catholyte solution 32 separately flow to the RFB 3 through the first and the second pipeline 11,12, one of the first and the second pipeline 11,12 is inserted into another one of them through the first tee 21 for further forming the third pipeline 13. In the third pipeline 13, if the anolyte solution 31 lacks energy and flows to the outer tube 131, the catholyte solution 32 will flow to the inner tube 132; and vice versa. Through the external electrodes 135 extended out of the inner and the outer conductive sleeve 133,134, the power supply 4 or the load 5 is further connected to directly charge/discharge power through the third pipeline 13. On charging power, the external electrodes 135 are connected to the power supply 4 to convert electrical energy into chemical energy through forward redox reactions. Thus, the third pipeline 13 directly charges and stores power in the anolyte and the catholyte solution 31,32, which lacks energy, for making the electrolytes become energy-rich, where the solutions flow forwardly. On discharging power, the external electrodes 135 are connected to the load 5 to convert chemical energy, which is stored in the energy-rich electrolytes, into electrical energy through backward redox reactions. Thus, the third pipeline 13 directly discharges power to be used by the load 5, where the solutions flow backwardly.

The present invention inserts an inner tube, which is made of an ion-exchange material, into each pipeline; an inner conductive sleeve and an outer conductive sleeve are put inside and outside on the inner tube, respectively; and, an anolyte solution and a catholyte solution flow into corresponding pipelines of the inner tube. Thus, wires connected with the inner and the outer conductive sleeve are used as external electrodes for charging/discharging power, where, on charging power, the solutions flow forwardly; yet, on discharging power, backwardly.

In this way, the present invention adds or supplements function of charging/discharging power by using pipelines. Even when an RFB is disabled or malfunctioned locally, electrolytes still charges/discharges power as usual through the pipelines for effectively improving or ensuring efficiency of the battery.

Figure 5:
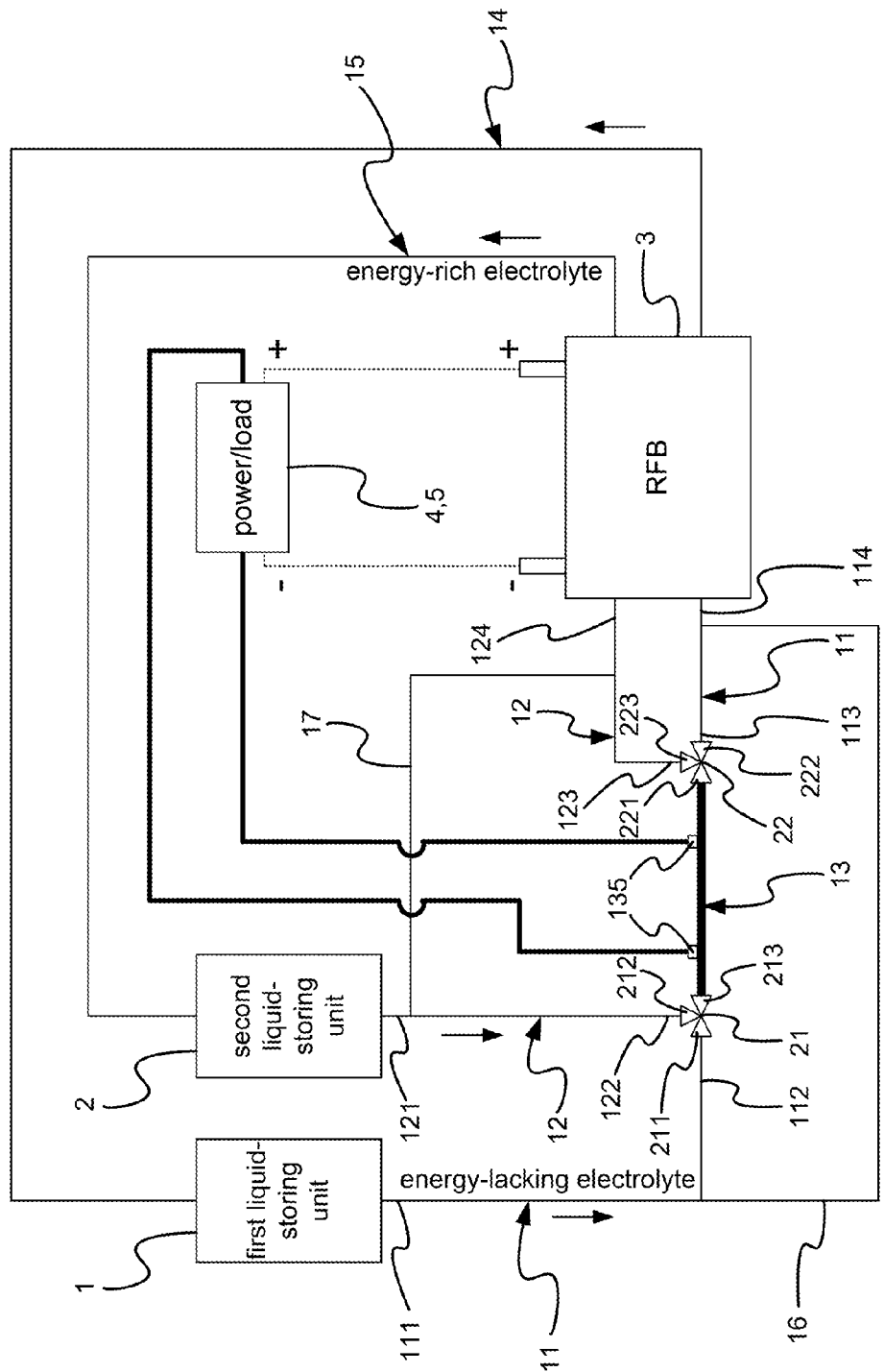
FIG. 5 is the structural view showing the second embodiment.
Figure 6:
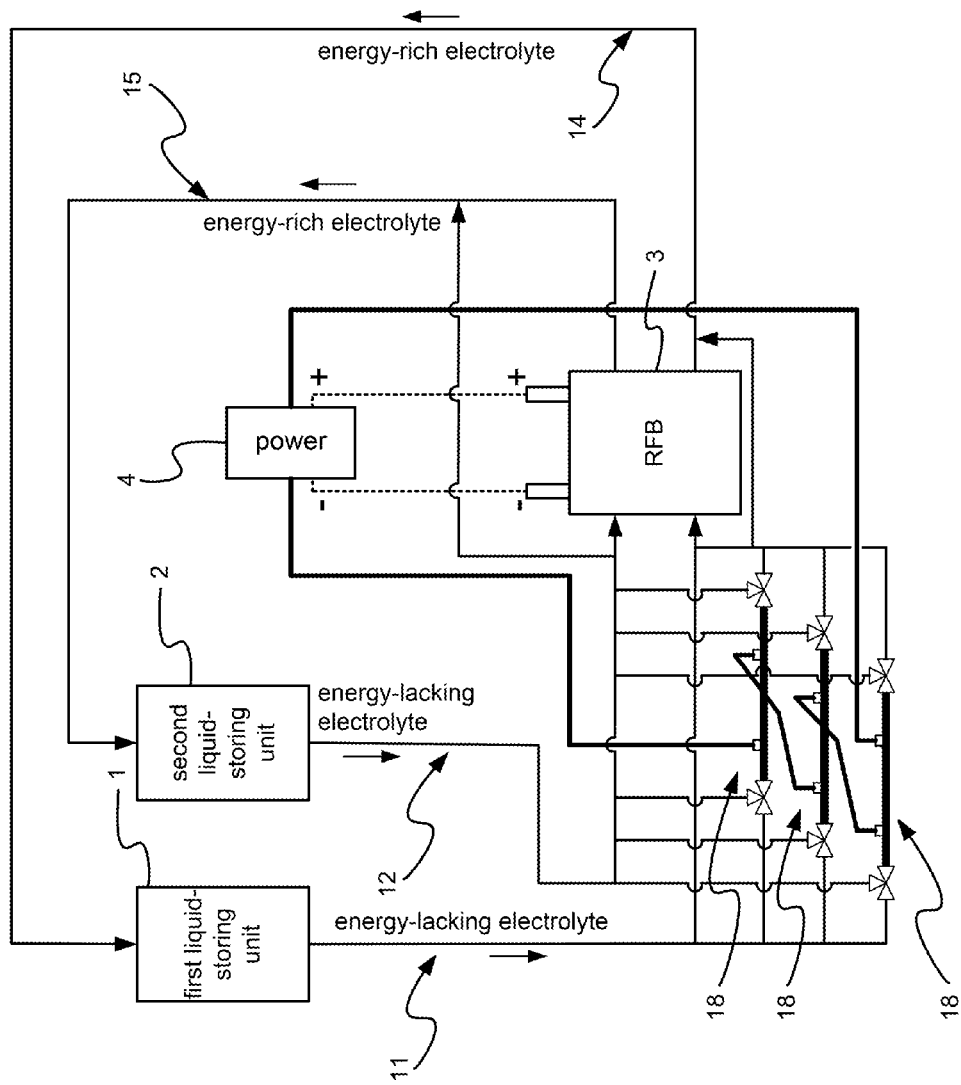
FIG. 6 is the structural view showing the third embodiment.
Figure 7:
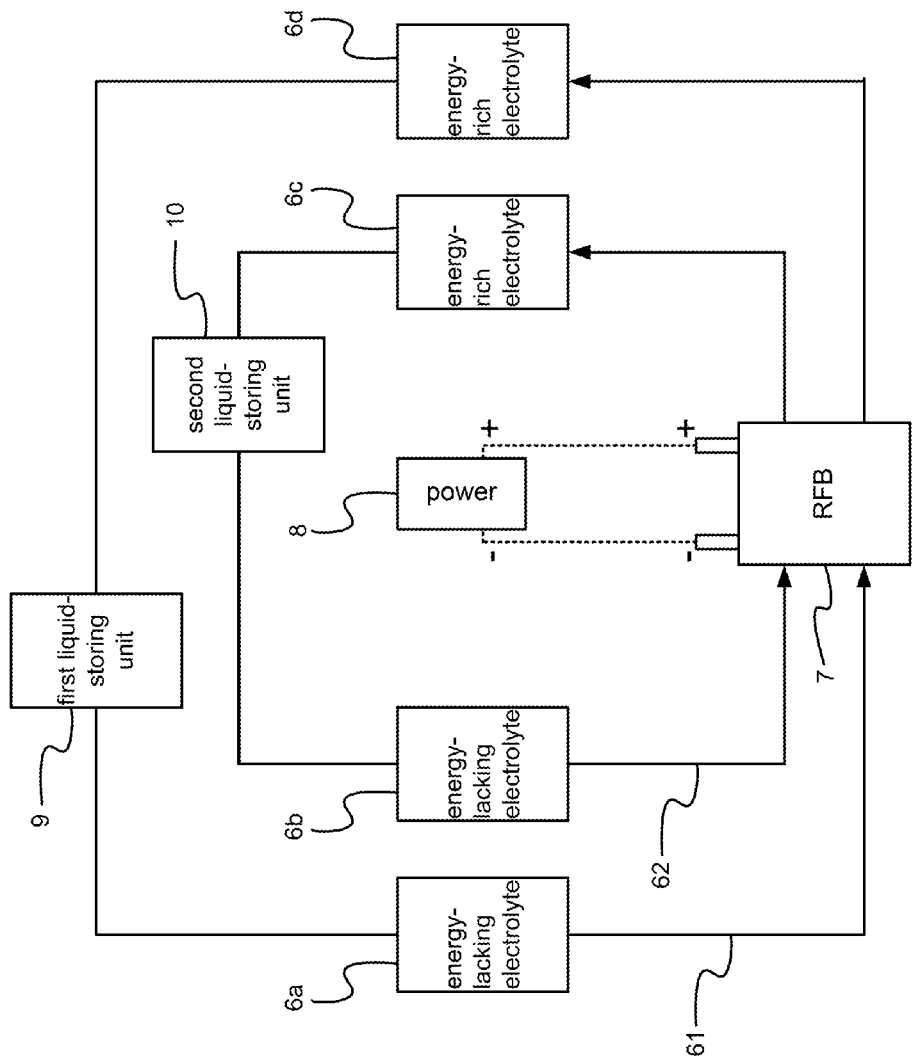
FIG. 7 is the structural view of the prior art.

Please refer to FIG. 5 and FIG. 6, which are structural views showing second and third embodiments. As shown in the figures, the present invention can have bypass pipelines. In FIG. 5, existing pipelines are further parallelly connected with extra bypass pipelines 16,17 to be provided as inlets/outlets of an RFB 3, which makes the present invention act as a backup battery. Furthermore, in FIG. 6, multiple pipelines of the same type 18 are parallelly connected, where potentials can be chosen by specific serial/parallel connections. Even when the RFB is totally disabled or malfunctioned, emergency power is supplied by using the pipelines as a backup battery. Hence, the present invention uses pipelines for charging/discharging power to be act as emergency power supply for effectively enhancing overall reliability of the RFB.

To sum up, the present invention is a method of charging/discharging power through pipelines flown with electrolytes, where power is charged/discharged by using pipelines and, even when an RFB is damaged or malfunctioned, electrolytes still charges/discharges power as usual through the pipelines for effectively improving or ensuring efficiency of the battery.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of charging/discharging power through pipelines flown with electrolytes the method comprising:
    inserting an inner tube into each one of pipelines of a redox flow battery (RFB), said inner tube is made of an ion-exchange material; installing an inner conductive sleeve and an outer conductive sleeve are obtained inside and outside said inner tube, respectively; flowing electrolytes into corresponding ones of said pipelines of said inner tube; and providing a wire connected with said inner conductive sleeve and another wire connected with said outer conductive sleeve to serve as external electrodes to obtain a function of charging/discharging power through said pipelines; and
    wherein, during charging power, said electrolytes flow forwardly and, during discharging power, said electrolytes flow backwardly.

2. The method according to claim 1,
wherein said pipelines are existing pipelines in said RFB.

3. The method according to claim 1,
wherein said function of charging/discharging power is a supplement to an existing function of charging/discharging power of said RFB.

4. The method according to claim 1,
wherein said pipelines comprises pipeline sections; said pipeline sections are connected to obtain a backup battery having potentials; and said pipeline sections are connected in a way selected from a group consisting of a serial way and a parallel way.

5. The method according to claim 1,
wherein an apparatus using the method comprises:
a first pipeline,
    wherein said first pipeline has a first end connected to a first liquid-storing unit to communicate a first-polar electrolyte through a way selected from a group consisting of a direct connection and an extended connection;
a second pipeline,
    wherein said second pipeline has a first end connected to a second liquid-storing unit to communicate a second-polar electrolyte through a way selected from a group consisting of a direct connection and an extended connection;
a first tee,
    wherein said first tee has a first inlet, a second inlet and an outlet; said first inlet is connected to a second end of said first pipeline through a way selected from a group consisting of a direct connection and an extended connection; said second inlet is connected to a second end of said second pipeline through a way selected from a group consisting of a direct connection and an extended connection; and, in said first tee, one pipeline selected from a group consisting of said first pipeline and said second pipeline is held inside another pipeline which is not said one pipeline selected in the group;
a third pipeline,
    wherein said third pipeline has an inlet connected to said outlet of said first tee; said third pipeline has an outer tube and an inner tube; said inner tube is located in said outer tube and is made of an ion-exchange material; an inner conductive sleeve and an outer conductive sleeve are put inside and outside of said inner tube, respectively; said first-polar electrolyte and said second-polar electrolyte flow into said inner tube and said outer tube, respectively; and
    wherein a wire connected with said inner conductive sleeve and another wire connected with said outer conductive sleeve are separately extended out said outer tube as served as, respectively;
a second tee,
    wherein said second tee has an inlet, a first outlet and a second outlet;
said inlet is connected to said outlet of said first tee through a way selected from a group consisting of a direct connection and an extended connection; said first outlet is connected to a third end of said first pipeline through a way selected from a group consisting of a direct connection and an extended connection; said second outlet is connected to a third end of said second pipeline through a way selected from a group consisting of a direct connection and an extended connection; said second tee separates said inner tube, along with said inner conductive sleeve, and said outer tube, along with said outer conductive sleeve, of said third pipeline to be separately connected back to said first pipeline and said second pipeline;
said RFB,
    wherein said RFB has an inlet, which is connected to a fourth end of said first pipeline and a fourth end of said second pipeline; said RFB is connected to an external power supply to charge power by converting electrical energy into chemical energy to be stored in said first-polar electrolyte and said second-polar electrolyte; and said RFB is externally connected to a load to discharge power by converting chemical energy, which is stored in said first-polar electrolyte and said second-polar electrolyte, into electrical energy to be released to said load;
a fourth pipeline,
    wherein said fourth pipeline has an end, which is connected to an outlet of said RFB, and another end, which is connected to said first liquid-storing unit, to output said first-polar electrolyte back to said first liquid-storing unit after charging/discharging power through redox reactions; and
a fifth pipeline,
    wherein said fifth pipeline has an end, which is connected to an outlet of said RFB, and another end, which is connected to said second liquid-storing unit, to output said second-polar electrolyte back to said second liquid-storing unit after charging/discharging power through redox reactions,
    wherein said external electrodes extended out said outer tube from said inner conductive sleeve and said outer conductive sleeve are optionally connected to said external power supply/said load to directly charge/discharge power through said third pipeline; on charging power, electrical energy is converted into chemical energy to be stored in said first-polar electrolyte and said second-polar electrolyte; and, on discharging power, chemical energy stored in said first-polar electrolyte and said second-polar electrolyte is converted into electrical energy to be released.

6. The method according to claim 5,
wherein each of said first tee and said second tee is selected from a group consisting of a reducing tee and a straight tee with reducer.

7. The method according to claim 5,
wherein each of said first tee and said second tee is selected from a group consisting of a Y-tee, a T-tee, a side-outlet tee, an equal-angle fork tee and a deformed tee; and said deformed tee is a multi-channel joint, which is restructured with sealed channel.

8. The method according to claim 5,
wherein said ion-exchange material is selected from a group consisting of a single material and a composite containing said single material; and said single material is a material selected from a group consisting of a cation-exchange material, an anion-exchange material and a proton-exchange material.

9. The method according to claim 5,
wherein said inner conductive sleeve and said outer conductive sleeve are made of conductive materials and fluids penetrate walls of said inner conductive sleeve and said outer conductive sleeve.

10. The method according to claim 5,
wherein each of said inner conductive sleeve and said outer conductive sleeve is selected from a group consisting of a braided sleeve and a holes sleeve; and said braided sleeve contains a material selected from a group consisting of carbon fiber, graphite fiber and metal.

11. The method according to claim 10,
wherein said metal is selected from a group consisting of a corrosion-resistant metal and a precious metal.

12. The method according to claim 5,
wherein said outer tube is made of a conductive material containing a material selected from a group consisting of graphite, conductive carbon, and metal.

13. The method according to claim 12,
wherein said metal is selected from a group consisting of a corrosion-resistant metal and a precious metal.

14. The method according to claim 5,
wherein said first-polar electrolyte and said second-polar electrolyte are separately an anolyte and a catholyte solutions of said RFB at an oxidation end and a reduction end.

* * * * *